(12) United States Patent
Brown (10) Patent No.: US 7,010,867 B2
(45) Date of Patent: Mar. 14, 2006

(54) ARTICULATED WELT FOOTWEAR CONSTRUCTION AND RELATED METHOD OF MANUFACTURE

(75) Inventor: William J. B. Brown, Ada, MI (US)

(73) Assignee: Wolverine World Wide, Inc., Rockford, MI (US)

( * ) Notice: Subject to any disclaimer, the term of this patent is extended or adjusted under 35 U.S.C. 154(b) by 121 days.

(21) Appl. No.: 10/725,647

(22) Filed: Dec. 2, 2003

(65) Prior Publication Data

US 2005/0022425 A1 Feb. 3, 2005

Related U.S. Application Data

(60) Provisional application No. 60/491,491, filed on Jul. 31, 2003.

(51) Int. Cl.
A43B 13/28 (2006.01)
A43B 7/22 (2006.01)

(52) U.S. Cl. ............... 36/12; 36/17 R; 36/30 R; 36/92

(58) Field of Classification Search ............ 36/12, 36/17 R, 17 A, 17 PW, 18, 21, 25 R, 30 R, 36/91, 92
See application file for complete search history.

(56) References Cited

U.S. PATENT DOCUMENTS

| | | | |
|---|---|---|---|
| 1,785,410 A | * | 12/1930 | Gilkerson ............. 36/17 R |
| 1,976,389 A | * | 10/1934 | Everston ............... 36/145 |
| 2,272,373 A | * | 2/1942 | Bennett ............... 12/142 F |
| 4,642,915 A | | 2/1987 | Pfander |
| 4,662,018 A | | 5/1987 | Autry |
| 4,685,223 A | | 8/1987 | Long |
| 4,704,808 A | | 11/1987 | Bianchini et al. |
| 5,768,801 A | | 6/1998 | Huff |
| 5,784,736 A | | 7/1998 | Issler et al. |
| 5,845,420 A | * | 12/1998 | Buccianti et al. ............. 36/91 |

(Continued)

FOREIGN PATENT DOCUMENTS

DE 895867 11/1953

(Continued)

OTHER PUBLICATIONS

Prior Art Reference A.

(Continued)

Primary Examiner—M. D. Patterson
(74) Attorney, Agent, or Firm—Warner Norcorss & Judd LLP (57) ABSTRACT

A footwear construction including an articulated welt. The footwear includes an upper and an outsole secured together with a welt in the forward portion of the footwear. The welt terminates short of the heel region of the footwear. In one embodiment, the outsole in the heel region is secured to a heel cradle which is further secured the upper. The footwear provides the durability of a welt construction in the forward portion of the shoe and the comfort and cushion of an athletic construction in the heel region of the shoe. A method for constructing the footwear includes securing an outsole to an upper with a welt in a forefoot and/or arch region of the shoe but not the heel region of the shoe. Optionally, a heel cradle is disposed in the heel region of the shoe and the outsole is secured to the heel cradle and/or upper in the heel region.

12 Claims, 5 Drawing Sheets

U.S. PATENT DOCUMENTS

| | | | |
|---|---|---|---|
| 5,893,186 A | | 4/1999 | Issler et al. |
| 6,000,148 A | * | 12/1999 | Cretinon .................. 36/88 |
| 6,029,301 A | | 2/2000 | Issler et al. |
| 6,601,319 B1 | * | 8/2003 | Clements ................ 36/17 R |
| 2003/0121177 A1 | | 7/2003 | Lee |

FOREIGN PATENT DOCUMENTS

| | | |
|---|---|---|
| DE | 36 39 362 | 5/1988 |
| EP | 974281 | 1/2000 |
| WO | WO 97/36511 | 10/1997 |
| WO | WO 02/102564 | 12/2002 |

OTHER PUBLICATIONS

Prior Art Reference B.
ARS, Dec. 1975, 3 pp.
STIL GAR, 2 pp.
FOTO SHOE, Aug. 1990, 3 pp.
FOTO SHOE, Feb. 1991, 2 pp.
ARS, 1969, 4 pp.
ARS, 1993, 3 pp.
ARS, 1991, 3 pp.
ARS, 1994, 3 pp.

* cited by examiner

ARTICULATED WELT FOOTWEAR CONSTRUCTION AND RELATED METHOD OF MANUFACTURE

This application claims benefit of U.S. Provisional Application No. 60/491,491, filed Jul. 31, 2003 and entitled "ARTICULATED WELT FOOTWEAR CONSTRUCTION AND RELATED METHOD OF MANUFACTURE."

BACKGROUND OF THE INVENTION

The present invention relates to footwear and, more particularly, to a footwear construction and method for making the same.

There is an ongoing effort in the footwear industry to produce footwear that provides durability and a high level of comfort. Such footwear is targeted toward individuals who stand for long periods of time on hard surfaces (e.g., concrete floors) or who must travel on foot for significant distances.

Conventional footwear constructions, however, provide either durability or comfort—but usually not both—because the features required for these characteristics typically negate one another. For example, one construction that is known for its durability is the welt construction, which typically is incorporated into work or safety boots. There are many different welt constructions, but in each a "welt," for example a strip of material such as leather, reinforced fabric or hard rubber, is stitched to the sole and the upper around the entire periphery of the shoe. The welt itself is semi-rigid or hard to withstand the forces exerted through the stitching and to secure the sole and upper together with extraordinary strength around the entire shoe. Although this construction is durable and aesthetically pleasing, it is a relatively heavy construction that compromises the flexibility and comfort of the shoe due to the welt and associated stitching.

At the end of the footwear spectrum, opposite welt constructions, are constructions built primarily for comfort, for example, sneaker or athletic constructions. In these "comfort" constructions, an upper is provided with an allowance which is folded inward toward the center of the shoe. An outsole is molded or cemented directly to the allowance. The outsole, usually of dual material or density, is contoured or shaped to conform to the wearer's foot and to offer a comfortable fit. Typically, the midsole is constructed of a soft material such as polyurethane or ethylvinyl acetate, which is bonded to an outsole of harder wearing material such as rubber or thermoplastic polyurethane. Although the comfort constructions provide comfortable cushioning for the wearer's foot, the soles wear out quickly and/or the uppers detach from the soles in a short time. Moreover, the transition between the upper and the sole of such constructions typically are abrupt, and accordingly, these constructions are only suitable for use with casual attire.

Although different constructions exist that provide either durability or comfort, there remains an unmet need for an integrated footwear construction that provides the best of both requirements.

SUMMARY OF THE INVENTION

The aforementioned problems are overcome in the present invention which provides a footwear construction including an articulated welt that secures the upper to the sole in a selected region of the footwear. In one embodiment, the forefoot region of the footwear includes a welt, but the heel region does not.

In another embodiment, the heel region includes a heel cradle to provide the desired amount of heel cushioning. The heel region may include a peripheral allowance to which the heel cushion is secured. In turn, an outsole is attached to the heel cushion or the stitching allowance thereby securing the sole to the upper in the heel portion of the shoe.

The footwear of the present invention is manufactured by: (a) joining an upper with an insole in only the forefoot and/or arch region; (b) stitching a welt to the upper in the forefoot and/or arch region, the welt terminating short of the heel region; (c) joining a midsole with the welt; (d) joining the midsole with an outsole; and (e) joining the outsole to the upper in the heel region and the heel cradle to the upper in the heel region. Optionally, a heel cradle is positioned between the outsole and the upper in the heel region.

The present invention provides a revolutionary footwear construction with an unparalleled combination of durability and comfort. The articulated welt construction makes the forefoot region of the footwear durable, well-supported and flexible. Moreover, the welt ensures strong attachment of the outsole to the upper in the forefoot region. In the heel region of the footwear, the heel cradle provides a cushion to provide extraordinary comfort by absorbing and returning energy produced in every step, and by offering a comfortable platform to stand on for long periods.

These and other objects, advantages and features of the invention will be more readily understood and appreciated by reference to the detailed description of the invention and the drawings.

DETAILED DESCRIPTION OF THE INVENTION

Figure 1:
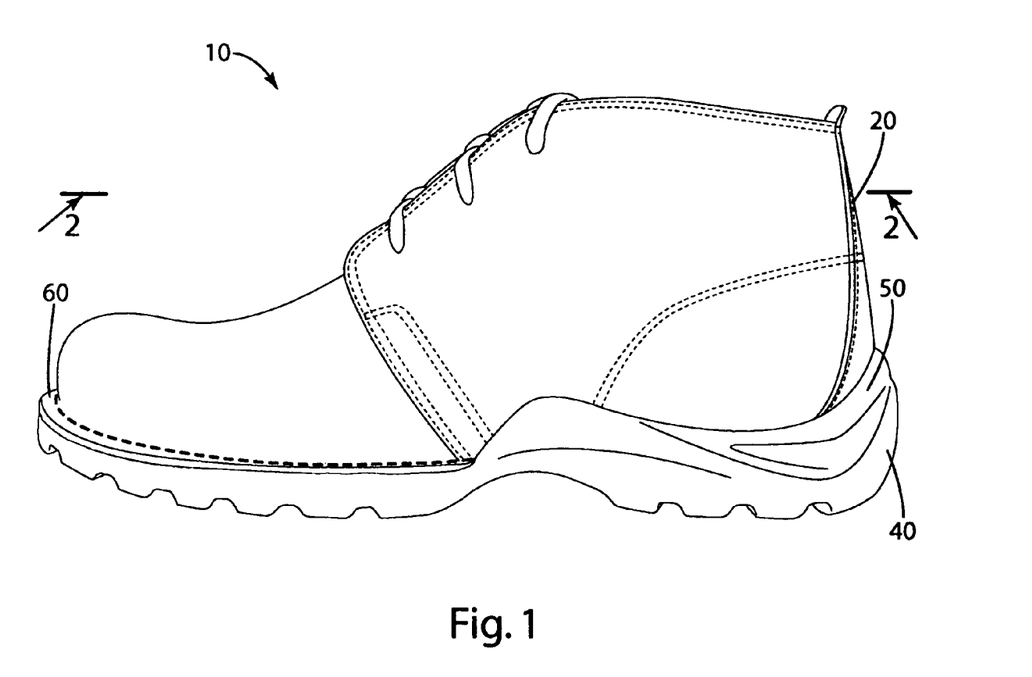
FIG. 1 is side elevational view of an article of footwear incorporating the articulated welt construction of the present invention.

A shoe incorporating the articulated welt construction of the present invention is shown in FIG. 1 and generally designated 10. For purposes of the disclosure, the present invention is described in connection with a ¾ height shoe, however, the present invention is well suited for use with other types of soled footwear.

In general, the shoe 10 includes an upper 20 secured to an outsole 40. The forefoot region includes a welt 60 to secure the outsole to the upper. The welt, however, terminates before, adjacent or in the arch region of the shoe. The heel region includes a heel cradle 50 positioned between the upper 20 and the outsole 40. Here, the upper is secured to the heel cradle and/or outsole without a welt.

As used herein, the term "arch region" refers generally to the portion of the shoe corresponding to the arch of the wearer's foot; the term "forefoot region" refers generally to the portion of the shoe forward of the arch region corresponding to the forefoot (e.g., the ball and the toes) of a wearer's foot; and the term "heel region" refers generally to that portion of the shoe rearward of the arch region corresponding to the heel of the wearer's foot. The forefoot region 42, arch region 43 and heel region 44 are generally identified in FIG. 2, however, it is to be understood that delineation of these regions may vary depending upon the configuration of the footwear.

The upper 20 is generally conventional and will not be described in detail. Suffice it to say that the upper 20 includes vamp 22, quarters 24 and backstay 26. In the forefoot region of the shoe, the upper 50 terminates in a stitching allowance 23, also referred to as a peripheral allowance, which is stitched to the welt 60 and the insole 70 as described in detail below. Optionally, the peripheral allowance 23 may extend rearward a selected amount into the arch region and heel region as desired. In the heel region, the upper terminates in a peripheral allowance 25. This peripheral allowance 25 is folded inward and secured to the insole 70, or alternatively strobel stitched secured to a fabric insock, as described in detail below. The upper 20 may be manufactured from leather, canvas, nylon, or other suitable materials and may include a liner (not shown) or other conventional accessories.

Figure 3:
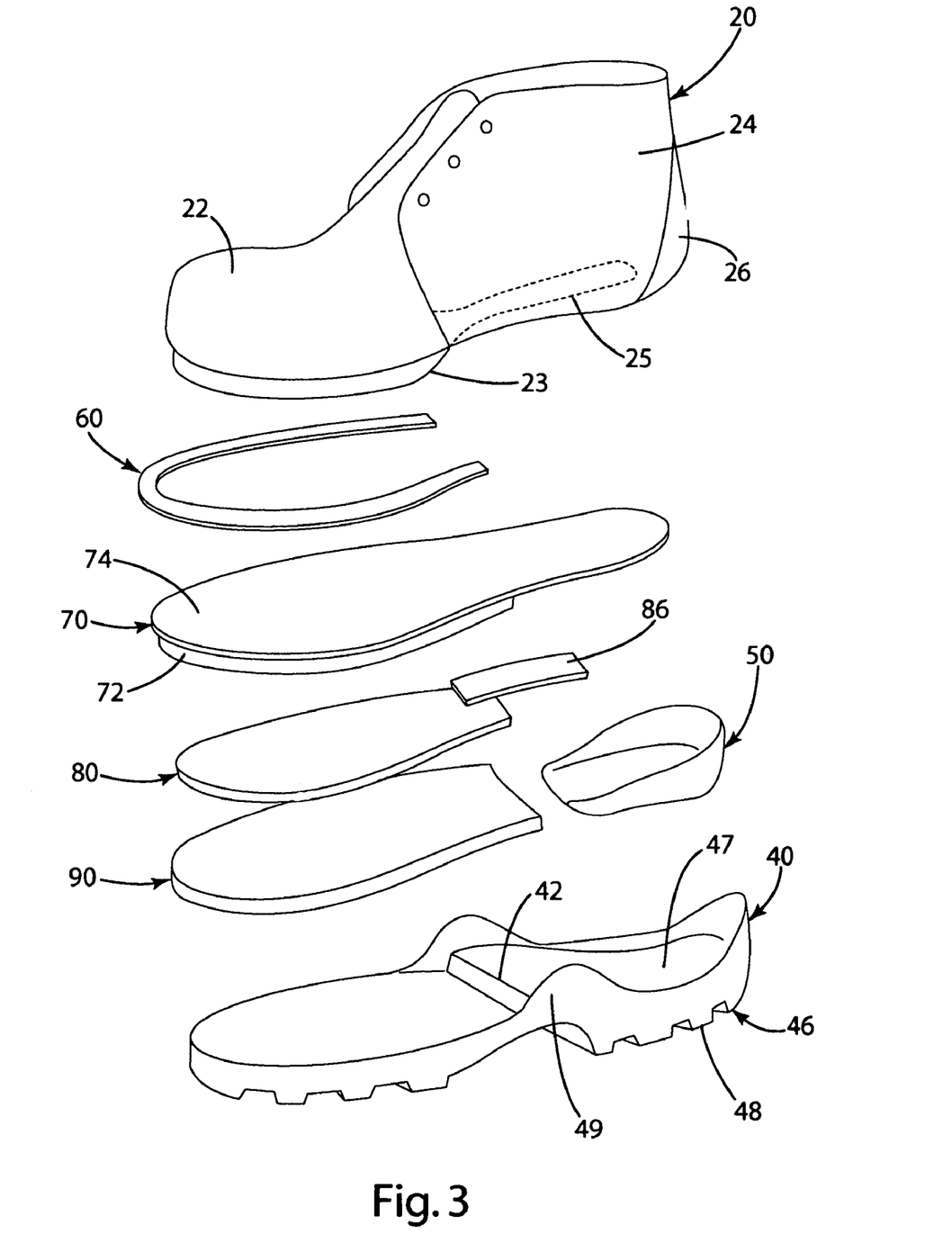
FIG. 3 is an exploded perspective view of the footwear.

The outsole 40 is manufactured from a relatively hard rubber or other sufficiently durable and wear-resistant material. The bottom 46 includes an outer surface 48 that forms the wearing surface of the outsole 40 and is contoured to the desired heel and tread pattern. The outer surface 48 may be textured to improve the traction and aesthetic appeal of the shoe. Optionally, the upper surface 47 of the outsole may be textured as desired. As shown in FIG. 3, the outsole 40 includes a wall 42 disposed in the arch region 43. This wall may be substituted with a rounded barrier or eliminated altogether. It also may be disposed in the forefoot region 42 and/or the heel region 44 as desired. The outsole further includes a flange 49 extending upwardly in at least the arch region, and optionally in the heel region.

Figure 2:
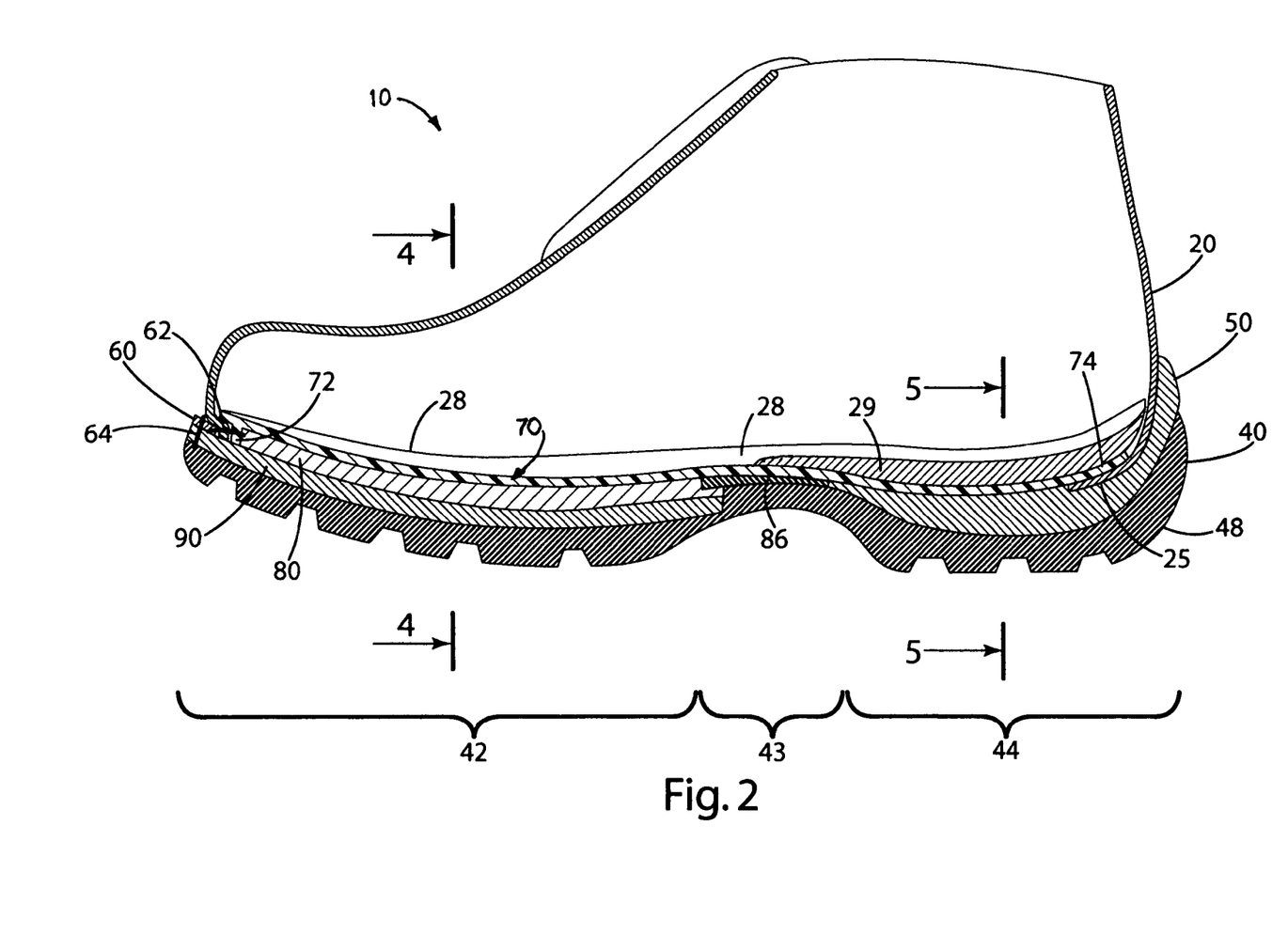
FIG. 2 is a sectional view of the footwear taken along line 2—2 of FIG. 1.
Figure 4:
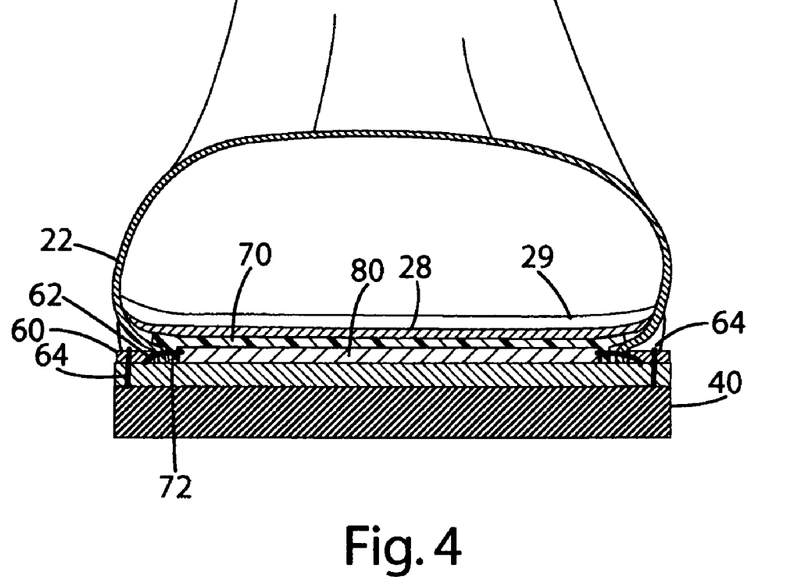
FIG. 4 is a sectional view of the footwear taken along lines 4—4 of FIG. 2.

As depicted in FIGS. 2–4, the welt 60 is stitched with stitching 62 to the peripheral allowance 23 and the insole rib 72 in the forefoot region 42. The welt 60 is secured to the upper 2 substantially only in the forefoot region 42, and extends around the periphery of the forefoot. The welt terminates forward of the heel region 44 without extending into the heel region. However, in some applications, the welt may extend into at least the arch region. For a clean appearance in the finished footwear, the ends of the welt 60 are disposed at the flange 49 of the outsole 40. As desired, the welt 60 may extend to the wall or barrier 42 of the outsole. The welt 60 is manufactured from leather, hard durable rubber, or other materials as desired.

The insole 70 includes an insole platform 74. A rib or flange 72 extends downwardly from the insole platform primarily in the forefoot region 42 to form a downwardly opening recess. In the embodiment shown, the rib terminates at or in the arch region, however, it may terminate before or in the forefoot, arch and/or heel regions as desired. Optionally, a filler 80 may be disposed within the recess defined by the insole rib 72. The insole platform 74 extends rearwardly through the arch region and into the heel region 44. In the heel region 44 and, optionally, the arch region 43, the insole platform 74 is secured via conventional means, for example, adhesives, cement, stitching or the like to the peripheral allowance 25 of the upper. Optionally, a shank 86 of steel, plastic or other material is secured to the bottom of the platform 74 in the arch region 43 of the shoe. The shank may be secured to other components of the shoe as desired, and may overlap with the other regions, for example, the forefoot region 42 and heel region 44.

Figure 6:
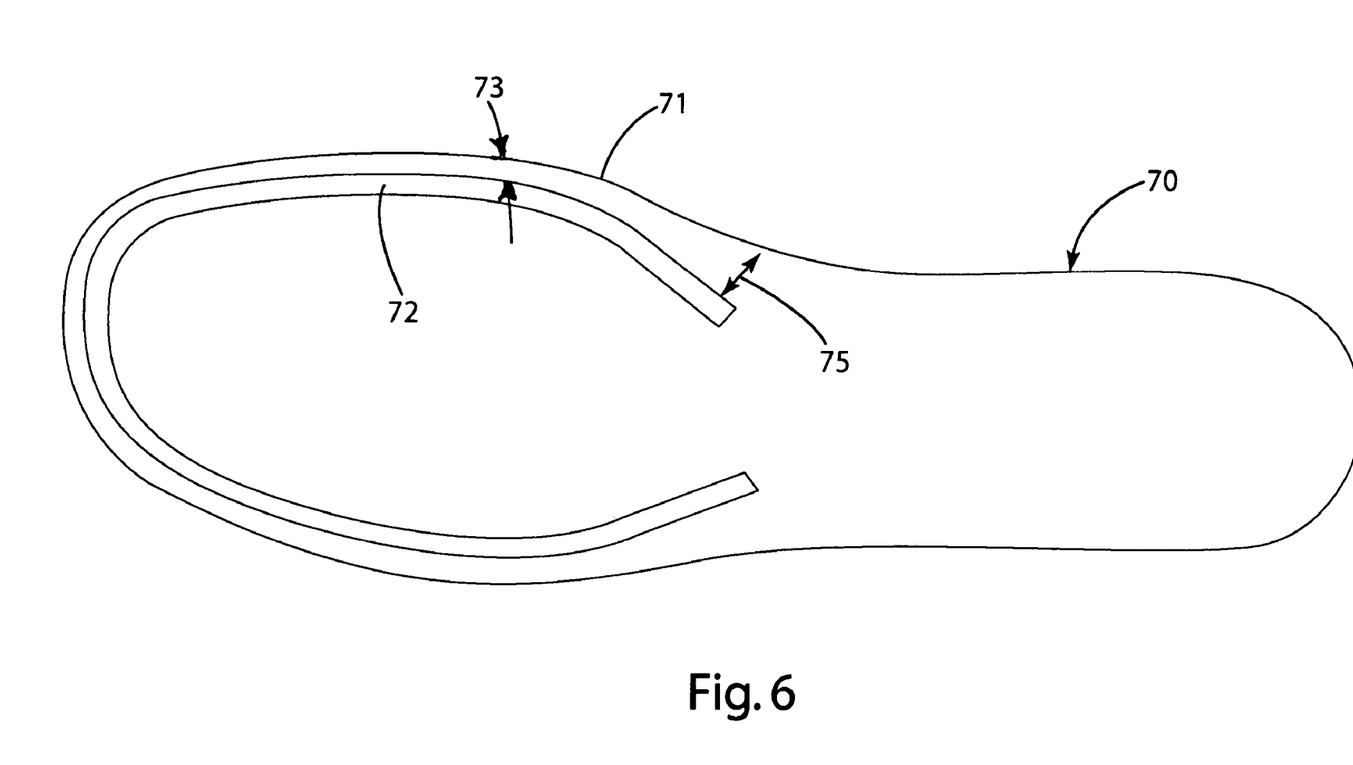
FIG. 6 is a bottom plan view of an insole that may be included in the footwear.

FIG. 6 illustrates an insole 70 that may be used in the footwear. This insole includes a flange 72 in the forefoot and/or arch region. The flange is inset a first distance 73 from the edge or outer periphery 71 of the insole around a portion of the forefoot. Where the flange 72 approaches the arch region and/or rearward part of the forefoot region, the flange is inset a distance 75 from the edge 71. This distance 75 is greater than the distance 73. Accordingly, the insole flange 72 tapers away from the insole edge 71, or inwardly toward the center line of the shoe. The flange 72 in this configuration is non-equidistant from the edge 71 in portions of the insole 70.

With reference to FIGS. 2 and 4, the shoe optionally includes a midsole 90. The midsole is stitched with stitching 64 to the welt 60. The midsole may be further secured to the filler 80 with cement or adhesives. This midsole preferably is coterminus with the welt, and when fully assembled, the outsole.

Figure 5:
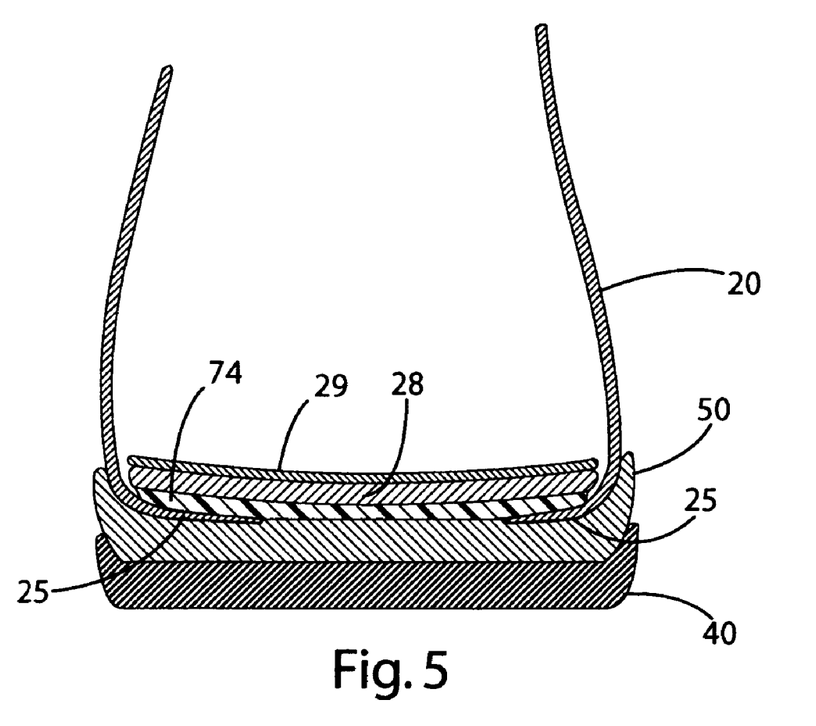
FIG. 5 is a sectional view of the footwear taken along lines 5—5 of FIG. 2.

With reference to FIGS. 2, 3 and 5, the shoe includes a heel cradle that snugly fits in or adjacent the outsole 40. The heel cradle 50 is preferably cup-shaped to cradle the heel of the wearer and extend upwardly around at least a portion of the wearer's heel. As shown, the heel cradle 50 is positioned substantially only in the heel region 44 and terminates at or slightly within the arch region 43. As desired, the cradle may terminate short of the arch region or may extend beyond the arch region into the forefoot region 42. This heel cradle is secured with adhesives or cement directly to the upper 20. In the embodiments shown, the cradle is adhered to the peripheral allowance 25 of the upper 20 and optionally, a portion in the undersurface of the insole platform 74. The heel cradle is preferably made from a low density cushioning material. In one embodiment, the heel cradle 50 is constructed from a ethylvinyl acetate (EVA) foam. The rigidity and the flexibility of the EVA foam can be varied from application to application as desired.

In the fully assembled footwear shown in FIGS. 2, 4 and 5, the outsole 40 is secured in the forefoot region to the midsole 90, and to at least the heel cradle 50 in the heel region 44. This securement may be provided by cement, adhesives or other conventional attachment means. When assembled, the midsole is adjacent the wall 42 of the outsole, however the midsole may also abut against the wall as desired. In constructions where the outsole does not include a wall, the heel cradle 50 may extend forward to abut or join with the midsole, filler (if used) and/or rib; or the midsole, filler (if used) and/or rib may extend rearward to abut against or join with the heel cradle. The shank 86 and exposed portion of the underside of the insole platform 74 may or may not be secured to the outsole 40 as desired.

In FIGS. 2, 4 and 5, the shoe 10 also includes an optional foot bed 29 and underfoot heel cushion 28. The foot bed may be constructed of polyurethane foam or other acceptable materials and conformed to the contours of the wearer's foot. The underfoot heel cushion 28 may be constructed of latex or other materials as desired.

MANUFACTURE AND ASSEMBLY

Manufacture of the shoe 10 will now be described with reference to FIGS. 3–5. The upper 20 is manufactured using generally conventional techniques and apparatus. The desired upper material (not shown) is cut to form the various elements of the upper, including the vamp 22, the quarters 24 and the back stay 26. The pieces of the upper 20 are fitted and sewn together. A lining (not shown) may be sewn within the upper during the fitting step.

The insole 70 is then fitted upon a last (not shown), and the fitted upper 20 is stretched over the insole and the last. In the heel region 44, the peripheral allowance 25 is secured with a cement, adhesive or other attachment means to the underside of the insole platform 74. The peripheral allowance 25 may be temporarily tacked or stapled to the last to hold the allowance in place. With the upper 20 secured to the insole 70 in the heel region 44, the welt 60 is attached to the stitching allowance 23 and the insole rib 72. This is accomplished by sewing stitching 62 through the welt 60, the stitching allowance 23 of the upper 20 and the insole rib 72.

In another step, the filler 80 is inserted in the recess defined by the insole rib. If desired, the filler is cemented to the undersurface of the insole platform 74. Optionally, the shank 86 is secured to the undersurface of the insole platform 74. The midsole 90 is stitched or sewn to the welt to secure a midsole 90 to the upper 20, substantially only in the forefoot region 42, however, where the midsole extends into the arch region 43, it may be secured to the welt and the upper there as well.

The outsole 40 is injection molded or pour molded from a hard, durable rubber using conventional molding apparatus. The tread pattern 48 on the lower surface 46, the upwardly extending flanges 48 and the wall 42 of the outsole are formed during the molding operation as integral parts of the outsole 40. With the outsole manufactured, the heel cradle 50 is secured to the outsole 40 in the heel region 44. In those applications were a large heel cradle is used, the cradle may also be secured to the arch region and possibly extend into the forefoot region 42 as desired. These components may be secured together with cement, adhesive or other attachment means.

In another step, the outsole 40 is secured with cement or adhesives to the midsole 90 in the forefoot region 42. Preferably, the midsole aligns with the wall 42 of the outsole 40 so that it is disposed adjacent and/or abuts the wall. In one embodiment, the outsole is secured to the remainder of the footwear so that the flange 48 conceals the terminating ends of the welt and provides a clean appearance. In the heel region 44, the heel cradle is adhered or cemented to the peripheral allowance 25 of the upper, and where exposed, the undersurface of the insole platform 74. In the arch region, the outsole may or may not be secured to the other components of the shoe as desired.

With the outsole 40 secured to the upper 20, the shoe 10 may be removed from the last. An underfoot cushion 28 and/or foot bed 29 may be inserted into the shoe over the insole platform 74 as desired. A number of conventional finishing operations may then be performed on the shoe 10. For example, the edges of the midsole 90 and the outsole 40 are trimmed and shaped; the upper 20 is cleaned, polished and treated as appropriate and necessary; and the laces are inserted into the eyelets.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

What is claimed is:

1. A footwear construction comprising:
   an upper including a forefoot portion and a heel portion, said upper including a peripheral allowance;
   an insole including a downwardly extending insole rib, said insole shaped to correspond to said forefoot portion, said insole rib terminating short of said heel portion;
   a welt secured to said peripheral allowance and said insole rib in said forefoot portion, said welt terminating short of said heel portion, said welt being fully exposed and visible in said forefoot portion in the completed footwear construction;
   a midsole secured to said welt in said forefoot portion, said midsole terminating short of said heel portion;
   a heel cradle secured to said peripheral allowance in said heel portion, said heel cradle extending upwardly along a portion of the upper; and
   an outsole secured to said midsole in said forefoot portion, said outsole secured to at least one of said heel cradle and said peripheral allowance in substantially only said heel portion.

2. The footwear construction of claim 1 wherein said outsole defines an upwardly extending flange and wherein said welt includes an end, said end terminating behind said flange so that said end is unviewable.

3. The footwear construction of claim 1 wherein said upper includes an arch region, and wherein said welt is stitched to said peripheral allowance substantially only in at least one of said forefoot region and said arch region.

4. The footwear construction of claim 1 wherein said upper includes an arch region, and wherein said outsole includes an upwardly extending wall that traverses at least a portion of a width of said outsole in at least one of said forefoot region and said arch region.

5. The footwear construction of claim 4 wherein said midsole terminates adjacent said upwardly extending wall.

6. A footwear construction comprising:
   an upper including a forefoot portion and a heel portion, said upper including a peripheral allowance;
   an insole including a downwardly extending insole rib, said insole shaped to correspond to said forefoot portion, said insole rib terminating short of said heel portion, wherein said insole includes a peripheral edge, and wherein the insole rib is inset from said peripheral edge a first distance and a second distance, said second distance greater than said first distance;
   a welt secured to said peripheral allowance and said insole rib in said forefoot portion, said welt terminating short of said heel portion;
   a midsole secured to said welt in said forefoot portion, said midsole terminating short of said heel portion;
   a heel cradle secured to said peripheral allowance in said heel portion; and
   an outsole secured to said midsole in said forefoot portion, said outsole secured to at least one of said heel cradle and said peripheral allowance in substantially only said heel portion.

7. The footwear construction of claim 6 wherein said indsole rib is inset said second distance along a portion of the rib that is closest to the heel portion.

8. A footwear construction comprising:
   an upper including a peripheral allowance;
   an outsole including a forefoot portion, an arch portion and a heel portion, said outsole further including an upwardly extending flange in at least one of said arch portion and said heel portion;
   a midsole joined with said outsole in substantially only at least one of said forefoot portion and said arch portion;

an insole including a downwardly extending flange substantially only in at least one of said forefoot region and said arch region;

a welt stitched to said midsole, said insole and said peripheral allowance in substantially only at least one of said forefoot portion and said arch portion, said welt terminating short of said heel portion, said welt tucked at least partially behind said upwardly extending flange so that a terminating end of said welt is concealed from view, whereby said outsole is joined with said upper in said forefoot region, but not in said heel portion, by said welt, wherein said welt remains fully visible in said forefoot portion of the completed footwear construction.

9. The footwear construction of claim 8 comprising a heel cradle joined with said outsole in substantially only at least one of said heel portion and said arch portion, said heel cradle extending upwardly along at least a portion of said upper.

10. The footwear construction of claim 9 wherein said heel cradle is secured to said peripheral allowance in substantially only at least one of said heel portion and said arch portion.

11. The footwear construction of claim 9 wherein said insole includes an outer periphery, said flange inset a distance from said outer periphery, said distance varying along at least a portion of the outer periphery.

12. The footwear construction of claim 11 wherein said upwardly extending flange is disposed in said arch region.

* * * * *

UNITED STATES PATENT AND TRADEMARK OFFICE
CERTIFICATE OF CORRECTION

PATENT NO. : 7,010,867 B2 Page 1 of 1
DATED : March 14, 2006
INVENTOR(S) : Brown It is certified that error appears in the above-identified patent and that said Letters Patent is hereby corrected as shown below:

Column 6,
Line 58, "indsole" should be -- insole --.

Signed and Sealed this

Sixteenth Day of May, 2006

JON W. DUDAS
*Director of the United States Patent and Trademark Office*